US012761595B2

(12) United States Patent
Nakae et al.

(10) Patent No.: US 12,761,595 B2
(45) Date of Patent: Oct. 13, 2026

(54) INTERMEDIATE TRANSFER UNIT, IMAGE FORMING APPARATUS INCLUDING SAME AND METHOD FOR MANUFACTURING INTERMEDIATE TRANSFER UNIT

(71) Applicant: KYOCERA Document Solutions Inc., Osaka (JP)

(72) Inventors: Sadanori Nakae, Osaka (JP); Ryosuke Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/048,557

(22) Filed: Feb. 7, 2025

(65) Prior Publication Data

US 2025/0264834 A1 Aug. 21, 2025

(30) Foreign Application Priority Data

Feb. 19, 2024 (JP) ................................ 2024-023124

(51) Int. Cl.
*G03G 15/00* (2006.01)
*G03G 15/16* (2006.01)

(52) U.S. Cl.
CPC ....... *G03G 15/5004* (2013.01); *G03G 15/161* (2013.01); *G03G 15/80* (2013.01); *G03G 2215/00978* (2013.01); *G03G 2215/0122* (2013.01)

(58) Field of Classification Search
CPC .. G03G 15/161; G03G 15/5004; G03G 15/80; G03G 15/1675; G03G 2215/00978; G03G 2215/0122
See application file for complete search history.

(56) References Cited

U.S. PATENT DOCUMENTS

2017/0205728 A1* 7/2017 Toichi ................ G03G 15/0266
2017/0205735 A1* 7/2017 Kitabayashi ....... G03G 15/1675
2017/0277110 A1 9/2017 Shibuya

FOREIGN PATENT DOCUMENTS

JP 2004-258432 A 9/2004
JP 2017-026872 A 2/2017

OTHER PUBLICATIONS

Extended European Search Report dated Jun. 12, 2025, issued by the European Patent Office in corresponding application EP 25157992.6.

* cited by examiner

*Primary Examiner* — Hoang X Ngo
(74) *Attorney, Agent, or Firm* — Stein IP, LLC

(57) ABSTRACT

An intermediate transfer unit includes a seamless intermediate transfer belt, a plurality of primary transfer members and a power supply line. On the intermediate transfer belt, toner images formed on a plurality of image carrying members are sequentially stacked. The primary transfer members are respectively arranged opposite the image carrying members via the intermediate transfer belt, and transfer the toner images formed on the image carrying members onto the intermediate transfer belt. The power supply line branches to at least two or more locations from a transfer voltage power supply which applies a primary transfer voltage to each of the primary transfer members to cause a primary transfer current to flow to each of the primary transfer members. The power supply line and each of the primary transfer members are connected via a high-voltage resistor unit that includes a plurality of resistors having different resistance values.

8 Claims, 6 Drawing Sheets

INTERMEDIATE TRANSFER UNIT, IMAGE FORMING APPARATUS INCLUDING SAME AND METHOD FOR MANUFACTURING INTERMEDIATE TRANSFER UNIT

INCORPORATION BY REFERENCE

This application is based upon and claims the benefit of priority from the corresponding Japanese Patent Application No. 2024-023124 filed on Feb. 19, 2024, the entire contents of which are incorporated herein by reference.

BACKGROUND

The present disclosure relates to an intermediate transfer unit, an image forming apparatus including the intermediate transfer unit and a method for manufacturing the intermediate transfer unit.

A conventional intermediate transfer unit includes a seamless intermediate transfer belt, a plurality of primary transfer members, a power supply line and a resistor. On the intermediate transfer belt, toner images formed on a plurality of image carrying members are sequentially stacked. The primary transfer members are respectively arranged opposite the image carrying members via the intermediate transfer belt, and transfer the toner images formed on the image carrying members onto the intermediate transfer belt. The power supply line branches to at least two or more locations from a transfer voltage power supply which applies a primary transfer voltage to each of the primary transfer members to cause a primary transfer current to flow to each of the primary transfer members. The resistor connects the power supply line and the primary transfer members.

In view of the problem described above, an object of the present disclosure is to provide an intermediate transfer unit which can suppress the occurrence of a transfer failure, an image forming apparatus which includes the intermediate transfer unit and a method for manufacturing the intermediate transfer unit.

SUMMARY

In order to achieve the object described above, the first configuration of the present disclosure is an intermediate transfer unit that includes a seamless intermediate transfer belt, a plurality of primary transfer members and a power supply line. On the intermediate transfer belt, toner images formed on a plurality of image carrying members are sequentially stacked. The primary transfer members are respectively arranged opposite the image carrying members via the intermediate transfer belt, and transfer the toner images formed on the image carrying members onto the intermediate transfer belt. The power supply line branches to at least two or more locations from a transfer voltage power supply which applies a primary transfer voltage to each of the primary transfer members to cause a primary transfer current to flow to each of the primary transfer members. The power supply line and each of the primary transfer members are connected via a high-voltage resistor unit that includes a plurality of resistors having different resistance values.

In order to achieve the object described above, the second configuration of the present disclosure is a method for manufacturing an intermediate transfer unit that includes a seamless intermediate transfer belt, a plurality of primary transfer members, a transfer voltage power supply, a power supply line and a high-voltage resistor unit. On the intermediate transfer belt, toner images formed on a plurality of image carrying members are sequentially stacked. The primary transfer members are respectively arranged opposite the image carrying members via the intermediate transfer belt, and transfer the toner images formed on the image carrying members onto the intermediate transfer belt. The power supply line branches to at least two or more locations from the transfer voltage power supply which applies a primary transfer voltage to each of the primary transfer members to cause a primary transfer current to flow to each of the primary transfer members. The high-voltage resistor unit connects the power supply line and each of the primary transfer members. The method for manufacturing an intermediate transfer unit includes a current measurement step and a resistor determination step. The current measurement step is a step of measuring the primary transfer current flowing to each of the primary transfer members. The resistor determination step is a step of determining a resistor of the high-voltage resistor unit based on the primary transfer current measured in the current measurement step. The current measurement step and the resistor determination step are sequentially repeated to configure the high-voltage resistor unit that includes the resistors having different resistance values.

Further objects of the present disclosure and specific advantages obtained by the present disclosure will become more apparent from the following description of an embodiment.

DETAILED DESCRIPTION

Figure 1:
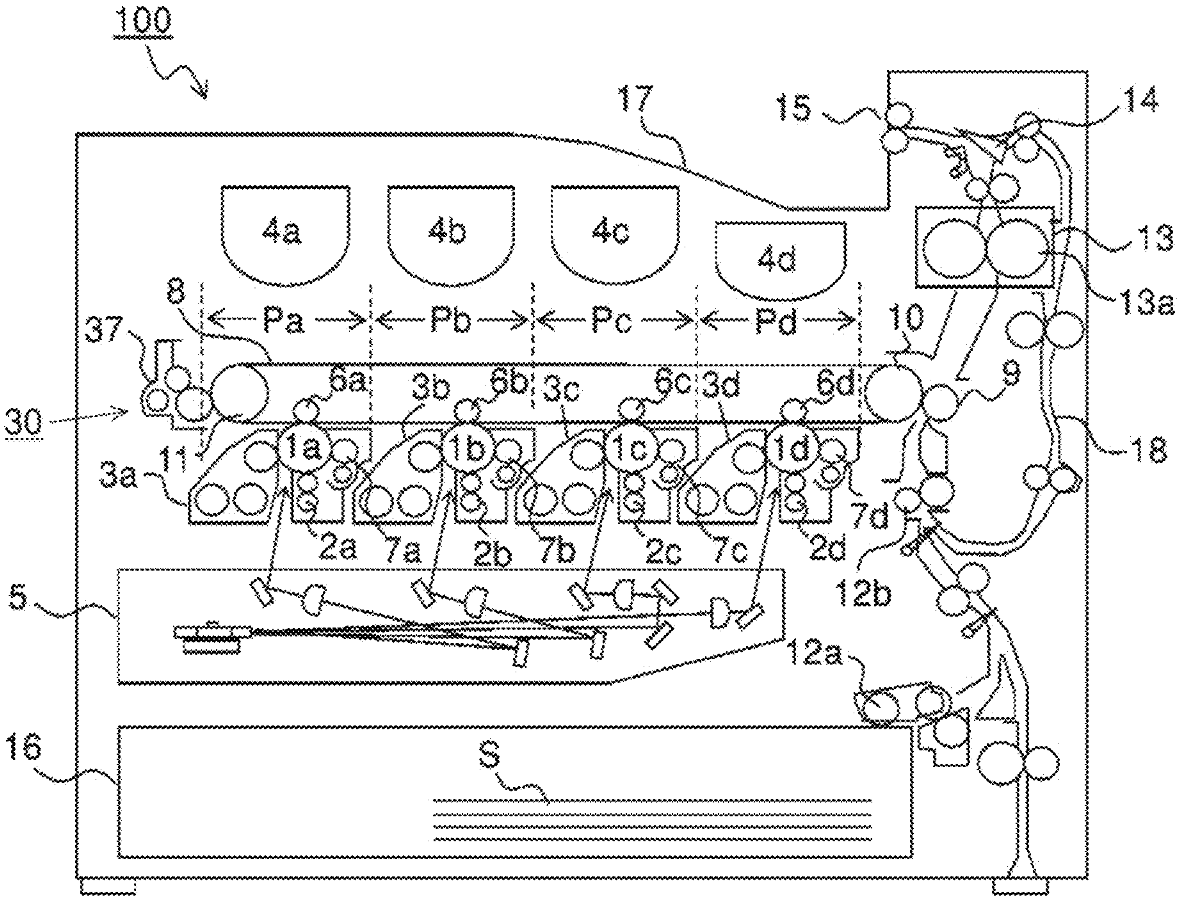
FIG. 1 is a schematic cross-sectional view showing an overall configuration of an image forming apparatus 100 according to an embodiment of the present disclosure.
Figure 2:
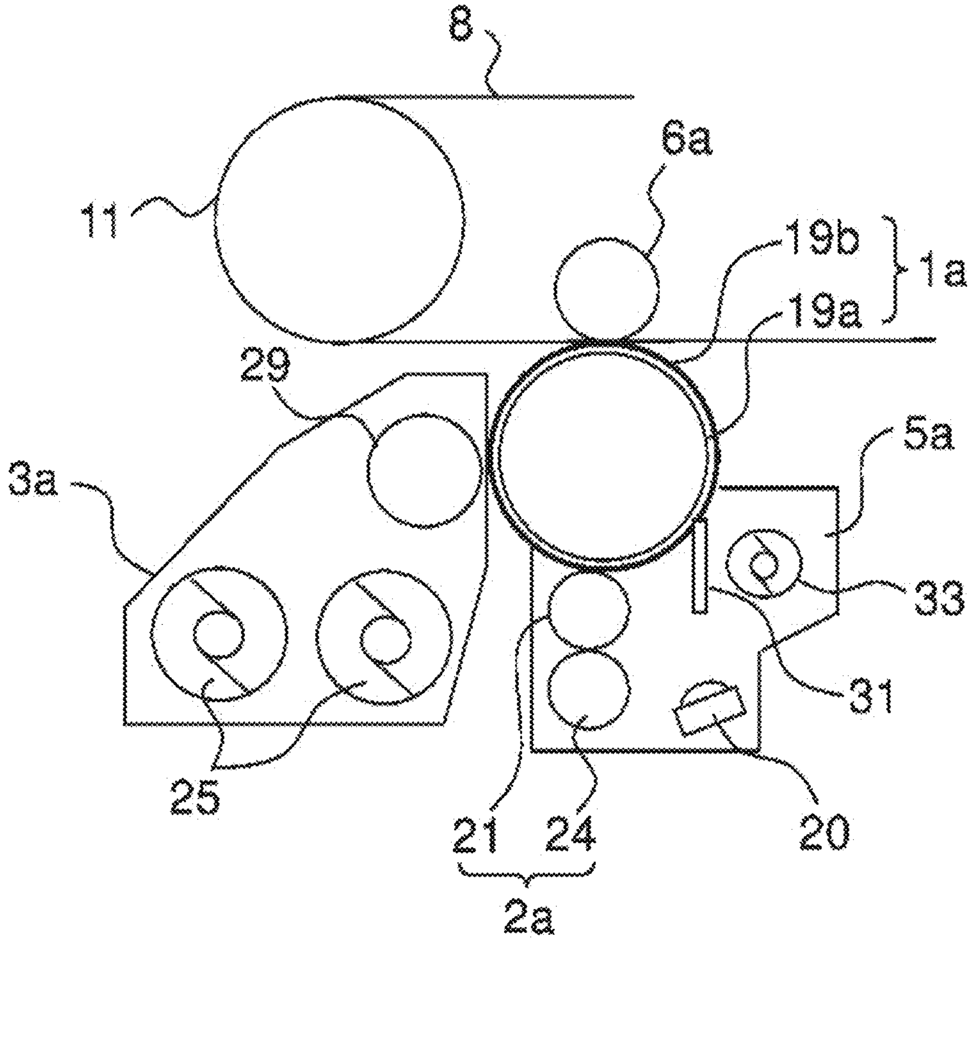
FIG. 2 is a partial enlarged view of an area around an image formation unit Pa shown in FIG. 1.

An embodiment of the present disclosure will be described below with reference to drawings. FIG. 1 is a schematic cross-sectional view showing the configuration of an image forming apparatus 100 according to the embodiment of the present disclosure, and FIG. 2 is an enlarged view of an area around an image formation unit Pa shown in FIG. 1. The configurations of image formation units Pb to Pd are basically the same as the configuration of the image formation unit Pa, and thus description thereof is omitted.

The image forming apparatus 100 includes the image formation units Pa, Pb, Pc and Pd and an intermediate transfer unit 30 which will be described later. The four image formation units Pa to Pd are aligned sequentially from an upstream side (left side in FIG. 1) in a conveyance direction. The image formation units Pa to Pd are provided according to images of four different colors (cyan, magenta, yellow and black), and they each form the images of cyan, magenta, yellow and black in steps of charging, exposure, development and transfer in a sequential manner.

In the image formation units Pa to Pd, photosensitive drums (image carrying members) 1*a*, 1*b*, 1*c* and 1*d* which carry visible images (toner images) of the colors are respectively provided. An intermediate transfer belt 8 which is stretched over a plurality of rollers including a drive roller 10 and a tension roller 11 and is rotated in a counterclockwise direction in FIG. 1 is further provided adjacent to the image formation units Pa to Pd. As shown in FIG. 2, a charging device 2*a*, a development device 3*a*, a cleaning device 7*a* and a static eliminator lamp 20 are provided around the photosensitive drum 1*a* along a drum rotating direction (in the counterclockwise direction in FIG. 2), and a primary transfer roller 6*a* is arranged through the intermediate transfer belt 8.

Each of the photosensitive drums 1*a* to 1*d* is formed with a conductive base member 19*a* and a photosensitive layer 19*b* formed on the surface of the conductive base member 19*a*. In the present embodiment, on the surface of the cylindrical conductive base member 19*a* made of aluminum, an organic photosensitive layer is stacked as the photosensitive layer 19*b*.

Each of the charging devices 2*a* to 2*d* includes: a charging roller 21 which makes contact with the photosensitive drum 1*a* to apply a charging voltage (direct-current voltage) to the surface of the drum; and a charging cleaning roller 24 for cleaning the charging roller 21. In the present disclosure, in order to decrease the amount of ozone generated and to reduce the cost of a charging voltage power supply 52 (see FIG. 4), the charging voltage formed with only a direct-current voltage is applied to the charging roller 21.

Each of the development devices 3*a* to 3*d* is a development device of a two-component development system which includes two stirring/conveying screws 25 and a development roller 29, and predetermined amounts of two-component developers containing toners of colors of cyan, magenta, yellow and black and a magnetic carrier are charged into the development devices 3*a* to 3*d*, respectively. In a state where the two-component developer is used to form a magnetic brush on the surface of the development roller 29 and a development voltage of the same polarity as the toner (here, the positive polarity) is applied to the development roller 29, the magnetic brush is brought into contact with the surface of the photosensitive drum 1*a* to adhere the toner thereto, and thus the toner image is formed. When the ratio of toner in the two-component developer charged into each of the development devices 3*a* to 3*d* drops below a specified value, the toners are supplied into the development devices 3*a* to 3*d* from toner containers 4*a* to 4*d*.

Figure 4:
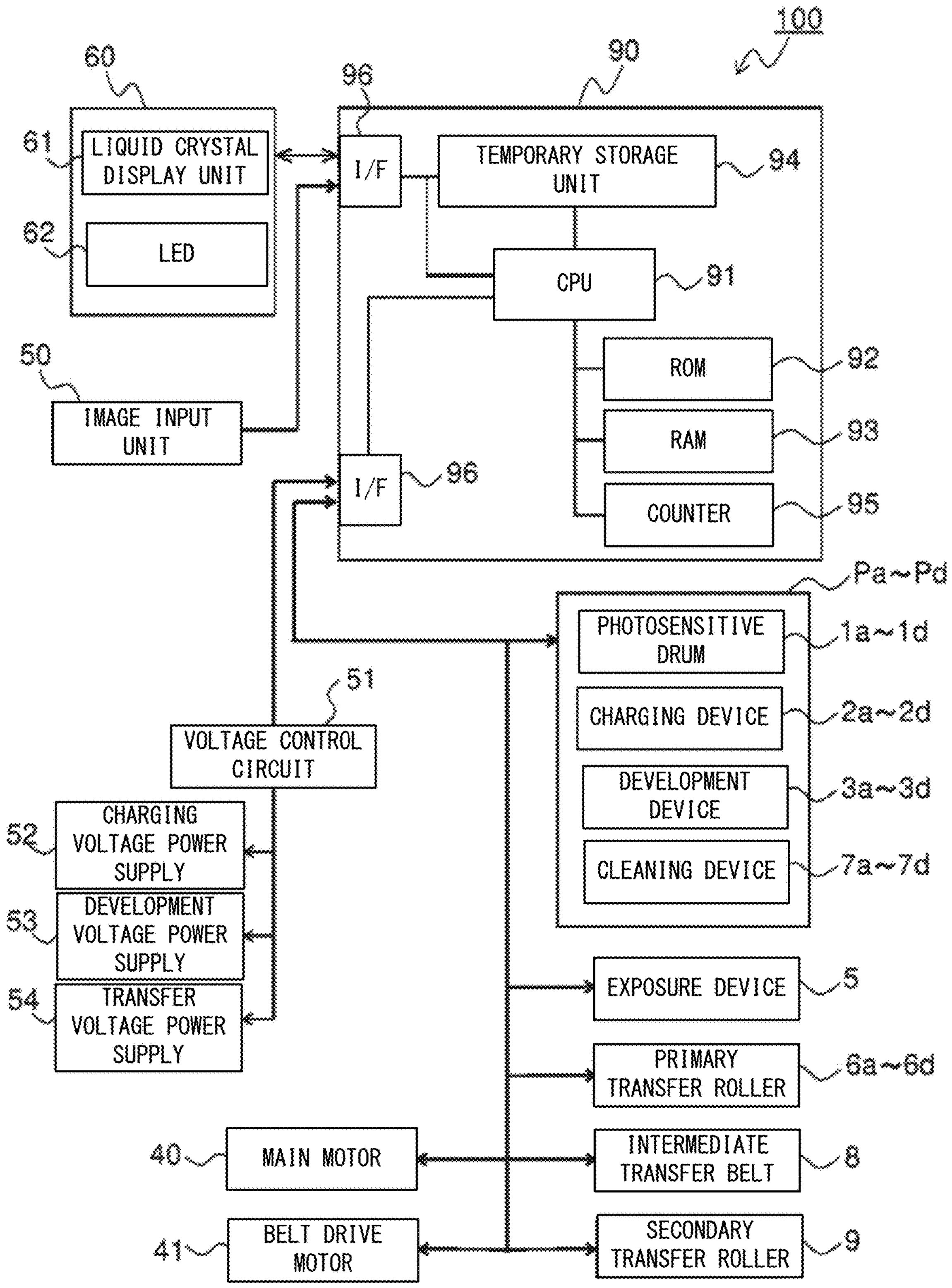
FIG. 4 is a block diagram showing a control path of the image forming apparatus 100 according to the embodiment of the present disclosure.

When image data is input from a host device such as a personal computer, the rotational drive of the photosensitive drums 1*a* to 1*d* is first stated by a main motor 40 (see FIG. 4). The rotational drive of the intermediate transfer belt 8 is also started by a belt drive motor 41 (see FIG. 4). Then, the charging devices 2*a* to 2*d* are caused to uniformly charge the surfaces of the photosensitive drums 1*a* to 1*d* to the same polarity as the toner (here, the positive polarity). Then, an exposure device 5 is caused to apply light according to the image data, and thus electrostatic latent images in which charging is attenuated according to the image data are formed on the photosensitive drums 1*a* to 1*d*. Then, the development devices 3*a* to 3*d* are caused to supply the toners onto the photosensitive drums 1*a* to 1*d*, and thus the toners are electrostatically adhered, with the result that the toner images corresponding to the electrostatic latent images are formed.

Then, the primary transfer rollers 6*a* to 6*d* are caused to apply a predetermined primary transfer electric field between the primary transfer rollers 6*a* to 6*d* and the photosensitive drums 1*a* to 1*d*, and thus the toner images of yellow, cyan, magenta and black on the photosensitive drums 1*a* to 1*d* are primarily transferred onto the intermediate transfer belt 8. The toners and the like which are left on the surfaces of the photosensitive drums 1*a* to 1*d* after the primary transfer are removed by the cleaning devices 7*a* to 7*d*. Residual charge which is left on the surfaces of the photosensitive drums 1*a* to 1*d* after the primary transfer is removed by the static eliminator lamp 20.

Transfer sheets S onto which the toner images are to be transferred are stored in a sheet cassette 16 arranged in a lower portion of the image forming apparatus 100. The transfer sheet S is conveyed to a nip portion (secondary transfer nip portion) between a secondary transfer roller 9 provided adjacent to the intermediate transfer belt 8 and the intermediate transfer belt 8 via a paper feed roller 12*a* and a registration roller pair 12*b* with predetermined timing. The transfer sheet S onto which the toner images on the intermediate transfer belt 8 have been secondarily transferred by the secondary transfer roller 9 is conveyed to a fixing unit 13.

The transfer sheet S which has been conveyed to the fixing unit 13 is heated and pressurized by the fixing roller pair 13*a*, and thus the toner images are fixed to the surface of the transfer sheet S, with the result that a predetermined full color image is formed. The transfer sheet S in which the full color image has been formed is ejected by an ejection roller pair 15 to an ejection tray 17 without being processed (or after being diverted by a branch unit 14 to a reverse conveyance path 18 to form images on both sides).

Figure 3:
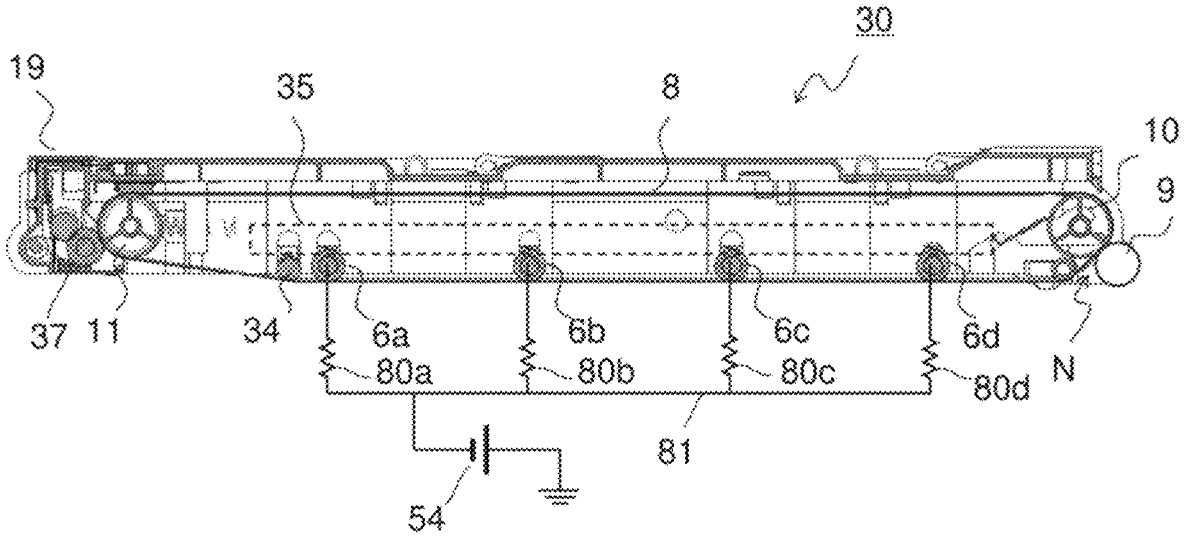
FIG. 3 is a side cross-sectional view of an intermediate transfer unit 30 included in the image forming apparatus 100 according to the embodiment of the present disclosure.

FIG. 3 is a side cross-sectional view of the intermediate transfer unit 30 included in the image forming apparatus 100. FIG. 3 schematically shows a power supply line 81 and high-voltage resistor units 80*a* to 80*d*. The intermediate transfer unit 30 includes the intermediate transfer belt 8 which is stretched over the drive roller 10 and the tension roller 11, the primary transfer rollers 6*a* to 6*d* which are in contact with the photosensitive drums 1*a* to 1*d* via the intermediate transfer belt 8 and a pressure switching roller 34.

The drive roller 10 and the tension roller 11 are respectively arranged on a downstream side and an upstream side with respect to the movement direction (conveyance direction) of the conveyance surface (lower surface) of the intermediate transfer belt 8. In a position opposite the tension roller 11, a belt cleaning unit 37 for removing the toners left on the surface of the intermediate transfer belt 8 is arranged (see FIG. 1). The secondary transfer roller 9 is pressed against the drive roller 10 via the intermediate transfer belt 8, and thus a secondary transfer nip portion N is formed.

The intermediate transfer unit 30 includes a roller contact/separation mechanism 35 which includes: a pair of support members 33 (see FIG. 5) that support both end portions of the rotation shafts of the primary transfer rollers 6*a* to 6*d* and the pressure switching roller 34 such that both end portions can be rotated and can be moved in a direction (up/down direction in FIG. 3) perpendicular to the movement direction of the intermediate transfer belt 8; and a drive means (not shown) that causes the primary transfer rollers 6*a* to 6*d* and the pressure switching roller 34 to reciprocate in the up/down direction. The roller contact/separation mechanism 35 can switch between a color mode in which the four primary transfer rollers 6*a* to 6*d* are respectively pressed against the photosensitive drums 1*a* to 1*d* via the intermediate transfer belt 8 (see FIG. 1), a monochrome mode in which only the primary transfer roller 6*d* is pressed against the photosensitive drum 1*d* via the intermediate transfer belt 8 and a retraction mode in which all the four primary transfer rollers 6*a* to 6*d* are separated from the photosensitive drums 1*a* to 1*d*.

The intermediate transfer unit 30 further includes the power supply line 81 and the high-voltage resistor units 80*a* to 80*d*. The power supply line 81 branches to at least two or more locations from a transfer voltage power supply 54 which applies a primary transfer voltage to each of the primary transfer rollers 6*a* to 6*d* and will be described later. The power supply line 81 causes a primary transfer current to flow to each of the primary transfer rollers 6*a* to 6*d*. The high-voltage resistor units 80*a* to 80*d* connect the power supply line 81 and the primary transfer rollers 6*a* to 6*d* to adjust the primary transfer current flowing to each of the primary transfer rollers 6*a* to 6*d*. The high-voltage resistor units 80*a* to 80*d* will be described in detail later.

In the present embodiment, the power supply line 81 branches to four locations to connect to the primary transfer rollers 6*a* to 6*d*. In this way, the high-voltage resistor units 80*a* to 80*d* are connected in parallel. Although the high-voltage resistor units 80*a* to 80*d* are connected in parallel, for example, the high-voltage resistor units 80*a* to 80*c* may be connected in parallel to the transfer voltage power supply 54, and the high-voltage resistor unit 80*d* may be independently connected to the transfer voltage power supply 54.

The control path of the image forming apparatus 100 according to the present disclosure will then be described. FIG. 4 is a block diagram showing an example of the control path used in the image forming apparatus 100 according to the present disclosure. Since various types of control are performed on the units of the apparatus when the image forming apparatus 100 is used, the overall control path of the image forming apparatus 100 is complicated. Hence, here, attention will be focused on units in the control path which are necessary for implementing the present disclosure.

A control unit 90 includes at least: a CPU (Central Processing Unit) 91 serving as a central processing unit; a ROM (Read Only Memory) 92 which is a read-only storage unit; a RAM (Random Access Memory) 93 which is a readable/writable storage unit; a temporary storage unit (storage unit) 94 which temporarily stores image data and the like; a counter 95 which totals and counts the number of printed sheets; and a plurality of (here, two) I/Fs (interfaces) 96 through which control signals are transmitted to devices in the image forming apparatus 100 and input signals are received from an operation unit 60. The control unit 90 can be arranged in any position inside the main body of the image forming apparatus 100.

The ROM 92 stores control programs for the image forming apparatus 100, numerical values and the like necessary for control and data and the like which are not changed during the use of the image forming apparatus 100. The RAM 93 stores necessary data generated during the control of the image forming apparatus 100 and data and the like which are temporarily required for the control of the image forming apparatus 100.

The control unit 90 causes the CPU 91 to transmit the control signals through the I/Fs 96 to the units and the devices in the image forming apparatus 100. The units and the devices transmit signals indicating the states thereof and the input signals to the CPU 91 through the I/Fs 96. Examples of the units and the devices controlled by the control unit 90 include the image formation units Pa to Pd, the exposure device 4, the primary transfer rollers 6*a* to 6*d*, the secondary transfer roller 9, the main motor 40, the belt drive motor 41, an image input unit 50, a voltage control circuit 51, the operation unit 60 and the like.

The image input unit 50 is a reception unit which receives the image data transmitted from a personal computer or the like to the image forming apparatus 100. Image signals input from the image input unit 50 are converted into digital signals, and are thereafter fed out to the temporary storage unit 94 via the I/Fs 96.

The voltage control circuit 51 is connected to the charging voltage power supply 52, a development voltage power supply 53 and a transfer voltage power supply 54, these power supplies are operated by output signals from the control unit 90 and the charging voltage power supply 52 is caused by the control signal from the voltage control circuit 51 to apply the charging voltage to the charging rollers 21 in the charging devices 2*a* to 2*d*. The development voltage power supply 53 applies the development voltage obtained by superimposing a development alternating-current voltage on a development direct-current voltage to the development rollers 29 in the development devices 3*a* to 3*d*. The transfer voltage power supply 54 applies the primary transfer voltage to each of the primary transfer rollers 6*a* to 6*d*. The transfer voltage power supply 54 also applies a secondary transfer voltage to the secondary transfer roller 9.

The charging voltage applied from the charging voltage power supply 52 to the charging roller 21 is preferably a direct-current voltage. When the charging voltage is a direct-current voltage, as compared with a case where the charging voltage is a voltage obtained by superimposing a direct-current voltage on an alternating-current voltage, the amount of discharge from the charging rollers 21 to the photosensitive drums 1*a* to 1*d* is decreased, with the result that the amount of wear of the photosensitive layers 19*b* of the photosensitive drums 1*a* to 1*d* can be reduced.

In the operation unit 60, a liquid crystal display unit 61 and LEDs 62 which indicate various types of states are provided, and a user operates a stop/clear button in the operation unit 60 to stop image formation, and operates a reset button to bring various types of settings of the image forming apparatus 100 into a default state. The liquid crystal display unit 61 shows the state of the image forming apparatus 100, the status of the image formation and the number of printed sheets. The various types of settings of the image forming apparatus 100 are performed from the print driver of the personal computer.

Figure 5:
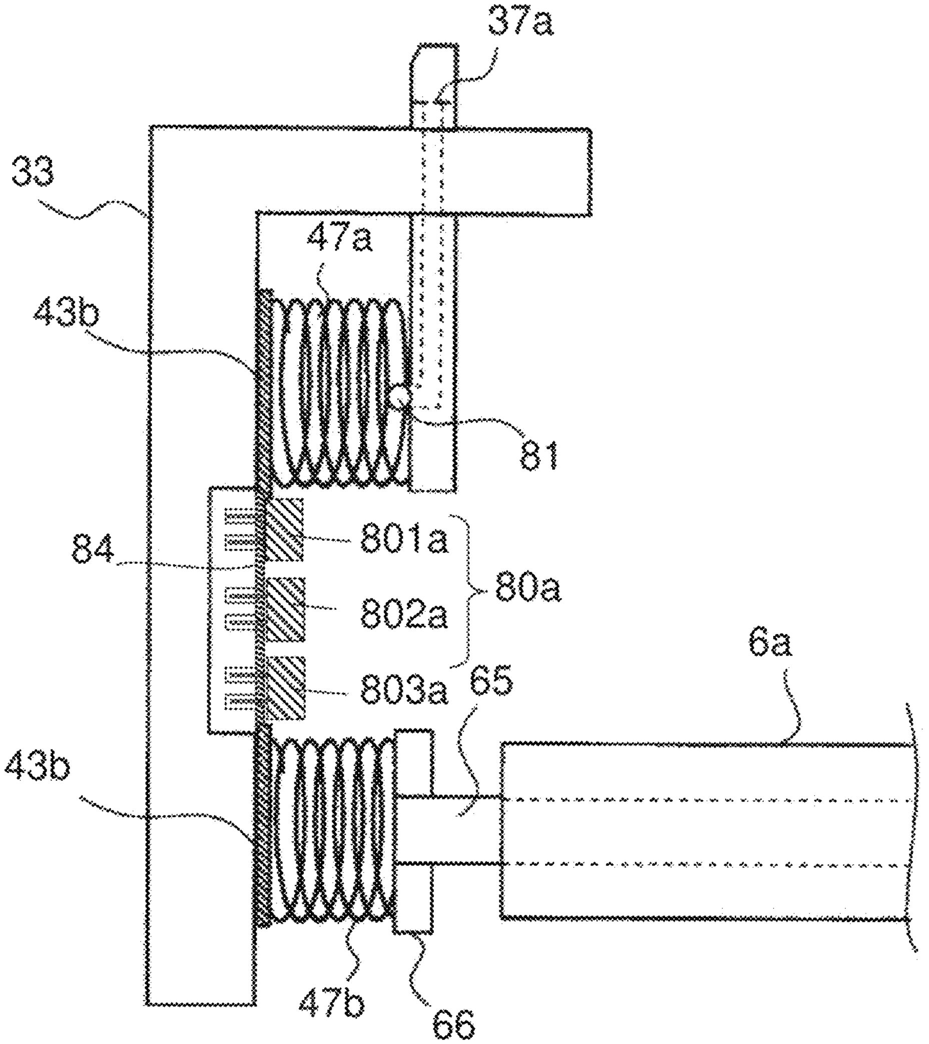
FIG. 5 is a partial cross-sectional view of an area around a high-voltage resistor unit 80*a* of the intermediate transfer unit 30 according to the embodiment of the present disclosure.

FIG. 5 is a partial cross-sectional view of an area around the high-voltage resistor unit 80*a* of the intermediate transfer unit 30. The high-voltage resistor units 80*b* to 80*d* basically have the same configuration as the high-voltage resistor unit 80*a*, and thus description thereof is omitted.

The high-voltage resistor unit 80*a* connects the power supply line 81 and the primary transfer roller (primary transfer member) 6*a*, and includes a plurality of resistors 801*a*, 802*a* and 803*a* having different resistance values. For each of the resistors 801*a* to 803*a*, a color code or a numerical value is used to indicate its resistance value. The resistors 801*a* to 803*a* are connected in series.

Between the power supply line 81 and the primary transfer roller 6*a*, contact springs 47*a* and 47*b*, leads 43*a* and 43*b*, a bearing portion 66 and the high-voltage resistor unit 80*a* are interposed. The bearing portion 66 rotatably supports the rotation shaft 65 of the primary transfer roller 6*a*.

The contact spring 47*a* connects the power supply line 81 and the lead 43*a*. The contact spring 47*b* connects the lead 43*b* and the bearing portion 66. The high-voltage resistor unit 80*a* connects the lead 43*a* and the lead 43*b*.

The power supply line 81 branches from a primary transfer contact terminal portion 37*a* which is electrically connected to the high-voltage board (not shown) of the transfer voltage power supply 54 to supply the primary transfer current to the primary transfer roller (primary transfer member) 6*a*.

In this way, the constituent elements from the primary transfer contact terminal portion 37*a* to the rotation shaft 65 of the primary transfer roller 6*a* are electrically connected. The current value of a current flowing from the transfer voltage power supply 54 to the primary transfer roller 6*a* is adjusted by the high-voltage resistor unit 80*a*, and thus an appropriate primary transfer voltage is applied to the primary transfer roller 6*a*. In the same configuration, an appropriate primary transfer voltage is applied to each of the primary transfer rollers 6*b* to 6*d*.

For example, the high-voltage resistor unit 80*a* is mounted on a circuit board 84 which electrically connects the leads 43*a* and 43*b*. Preferably, the resistance value of the resistor 801*a* is equal to or greater than 100 MΩ, and the resistance value of the resistors 802*a* and 803*a* is equal to or greater than 1 MΩ and equal to or less than 100 MΩ. In other words, the resistance value of the resistor 801*a* which is one of the resistors of the high-voltage resistor unit 80*a* is equal to or greater than 100 MΩ, and the resistance value of the resistors 802*a* and 803*a* which are the others of the resistors is equal to or greater than 1 MΩ and equal to or less than 100 MΩ.

For the high-voltage resistor unit 80*a*, the resistance value of the high-voltage resistor unit 80*a* can be adjusted by combining a plurality of resistors 801*a* to 803*a* having different resistance values. For example, although in the present embodiment, the high-voltage resistor unit 80*a* includes three resistors 801*a* to 803*a*, the resistor 803*a* may be omitted. In this way, the resistance value of the high-voltage resistor unit 80*a* can be lowered. The high-voltage resistor unit 80*a* may be formed by combining four or more resistors. In this way, the resistance value of the high-voltage resistor unit 80*a* can be freely set. The arrangement of the resistors 801*a* to 803*a* is not particularly limited.

Although an air gap (not shown) is formed on the circuit board 84 when the resistor 803*a* is omitted, for example, a lead wire is arranged, and thus the power supply line 81 and the primary transfer roller 6*a* are connected stably and electrically.

The resistance value of the high-voltage resistor unit 80*a* can be adjusted while the current value of a current flowing to the primary transfer roller 6*a* is being measured.

Here, the resistance value of the resistor 801*a* which is one of the resistors is set equal to or greater than 100 MΩ, and thus the resistance value of the high-voltage resistor unit 80*a* can be caused to approach a target value by first mounting the resistor 801*a* which has such a large resistance value as to pass a target primary transfer current. Thereafter, the resistors 802*a* and 803*a* the resistance value of which is so small as to be equal to or greater than 1 MΩ and equal to or less than 100 MΩ are mounted, and thus the resistance value of the high-voltage resistor unit 80*a* can be finely adjusted. In this way, it is possible to efficiently adjust the resistance value of the high-voltage resistor unit 80*a*.

Hence, preferably, the resistance values of the high-voltage resistor units 80*a* to 80*d* which are connected to the primary transfer rollers 6*a* to 6*d* aligned in the conveyance direction of the toner images are sequentially decreased toward a downstream side in the conveyance direction. Specifically, the resistors are adjusted by being combined such that the resistance values of the high-voltage resistor unit 80*a*, the high-voltage resistor unit 80*b*, the high-voltage resistor unit 80*c* and the high-voltage resistor unit 80*d* are sequentially decreased in this order.

The resistance values of the high-voltage resistor units 80*a* to 80*d* are lowered, and thus larger primary transfer currents can be caused to flow to the primary transfer rollers 6*a* to 6*d*. The resistance values of the high-voltage resistor units 80*a* to 80*d* are sequentially decreased toward the downstream side in the conveyance direction of the toner images, and thus the primary transfer currents flowing to the primary transfer rollers 6*a* to 6*d* are sequentially increased in the order of the primary transfer rollers 6*a* to 6*d*. Since the toner images which are to be conveyed by the intermediate transfer belt 8 are sequentially overwritten toward the downstream side, a larger primary transfer current is caused to flow to a more downstream primary transfer roller, and thus the occurrence of a transfer failure can be reduced.

The resistance values of the high-voltage resistor units 80*a* to 80*d* are preferably greater than the resistance values of the primary transfer rollers 6*a* to 6*d* which are connected. The high-voltage resistor units 80*a* to 80*d* the resistance values of which are sufficiently greater than the resistance values of the primary transfer rollers 6*a* to 6*d* are arranged, and thus it is possible to relatively decrease variations in the resistance values of the primary transfer rollers 6*a* to 6*d*. For example, preferably, when a primary transfer voltage of 1000V is applied, the resistance values of the primary transfer rollers 6*a* to 6*d* are greater than 5.0 (log Ω), and the resistance values of the high-voltage resistor units 80*a* to 80*d* are 10 or more times the resistance values of the primary transfer rollers 6*a* to 6*d*.

The transfer currents flowing to the primary transfer rollers 6*a* to 6*d* which are obtained when the resistance values of the high-voltage resistor units 80*a* to 80*d* are adjusted or the primary transfer voltages which are applied may be stored in the temporary storage unit (storage unit) 94, and the control unit 90 may perform the image formation based on the transfer currents or the primary transfer voltages stored in the temporary storage unit 94. In this way, it is possible to more reduce the occurrence of a transfer failure.

Figure 6:
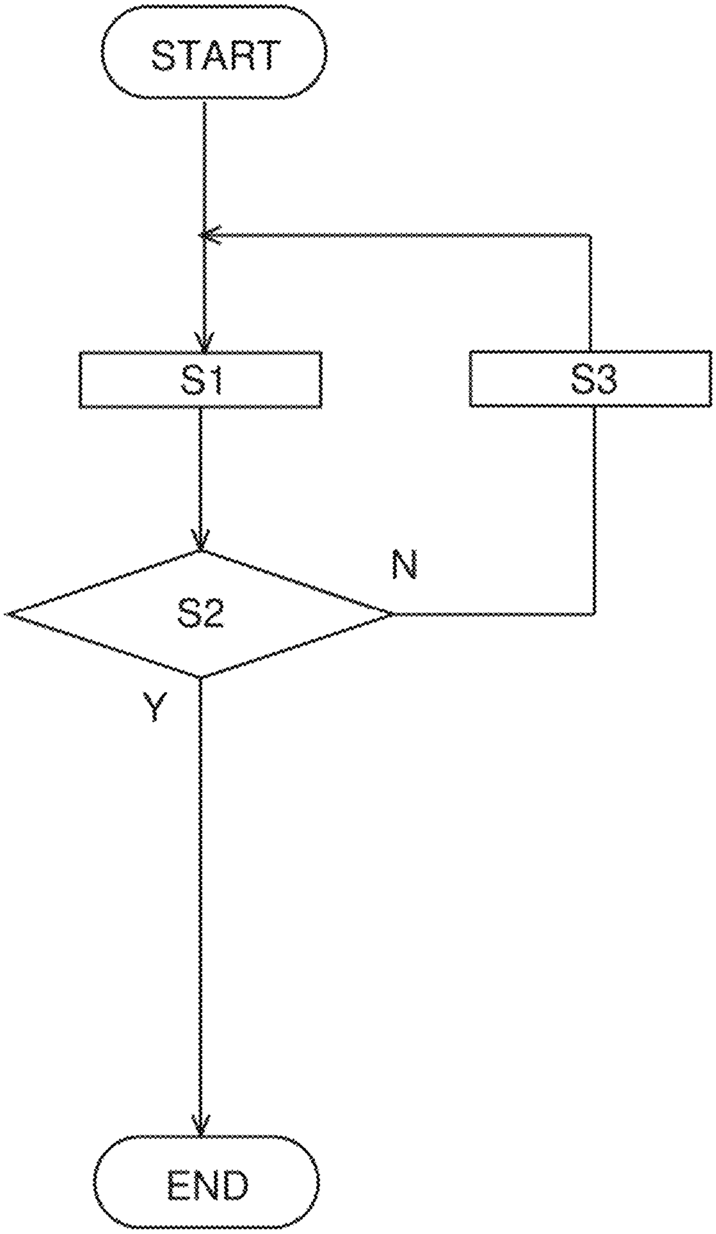
FIG. 6 is a flowchart showing the manufacturing process of the intermediate transfer unit 30 according to the embodiment of the present disclosure.

FIG. 6 is a flowchart showing the manufacturing process of the intermediate transfer unit 30. In step S1, a primary transfer voltage is applied from the transfer voltage power supply 54 to each of the primary transfer rollers 6*a* to 6*d*, and then a primary transfer current which flows to each of the primary transfer rollers 6*a* to 6*d* is measured. In step S2, whether the measured primary transfer current individually reaches a target value is determined. When the primary transfer current does not reach the target value, the processing transfers to step S3. On the other hand, when the primary transfer current reaches the target value, the resistance values of the high-voltage resistor units 80*a* to 80*d* are determined to be appropriate.

In step S3, the resistor 801*a* is mounted on the circuit board 84, the resistance values of the high-voltage resistor units 80*a* to 80*d* are adjusted and the processing returns to step S1. Steps S1 to S3 are repeated, and thus the resistance value of the high-voltage resistor unit 80*a* can be adjusted by combining the resistors 802*a* and 803*a*. The high-voltage resistor units 80*a* to 80*d* are adjusted, and thus optimal primary transfer currents can be caused to flow to the primary transfer rollers 6*a* to 6*d*. In this way, it is possible to manufacture the intermediate transfer unit 30 which can prevent the occurrence of a transfer failure.

When steps S1 to S3 are repeated, in step S3, a resistor which has a resistance value lower than the resistance value of a resistor which has been added previously is mounted on the circuit board 48. In this way, the resistance values of the high-voltage resistor units 80*a* to 80*d* are finely adjusted in a gradual manner, and thus the optimal resistance values of the high-voltage resistor units 80*a* to 80*d* can be obtained by performing the adjustment a small number of times.

In other words, a method for manufacturing the intermediate transfer unit 30 according to the present embodiment includes a current measurement step (step S1) and a resistor determination step (step S3). In the current measurement step, the primary transfer current flowing to each of the primary transfer rollers 6*a* to 6*d* is measured. In the resistor determination step, the resistors 801*a* to 803*a* of the high-voltage resistor units 80*a* to 80*d* are determined based on the primary transfer currents measured in the current measurement step. The current measurement step and the resistor determination step are sequentially repeated to configure the high-voltage resistor units 80*a* to 80*d* which include the resistors 801*a* to 803*a* having different resistance values. The high-voltage resistor units 80*a* to 80*d* are adjusted, and thus the optical primary transfer currents can be caused to flow to the primary transfer rollers 6*a* to 6*d*.

The resistance value of the resistors 802*a* and 803*a* which is determined in the subsequent round of the resistor determination step (step S3) is less than the resistance value of the resistor 801*a* which has been determined in the previous round of the resistor determination step (step S3). In this way, the resistance values of the high-voltage resistor units 80*a* to 80*d* are finely adjusted in a gradual manner, and thus the optimal resistance values of the high-voltage resistor units 80*a* to 80*d* can be obtained by performing the adjustment a small number of times. Hence, the intermediate transfer unit 30 can be efficiently manufactured.

Although the embodiment of the present disclosure has been described above, the scope of the present disclosure is not limited to the embodiment, and various changes can be added without departing from the spirit of the disclosure.

Although in the description of the embodiment which is performed by the above method, as an example of the image forming apparatus 100, the color printer as shown in FIG. 1 is used, the image forming apparatus 100 is not limited to the color printer, and may be another image forming apparatus such as a monochrome copying machine, a color copying machine, a digital multifunctional peripheral or a facsimile.

The present disclosure can be utilized for image forming apparatuses including charging rollers.

What is claimed is:

1. An intermediate transfer unit comprising:
- a seamless intermediate transfer belt on which toner images formed on a plurality of image carrying members are sequentially stacked;
- a plurality of primary transfer members that
  - are respectively arranged opposite the image carrying members via the intermediate transfer belt, and
  - transfer the toner images formed on the image carrying members onto the intermediate transfer belt; and
- a power supply line that
  - branches to at least two or more locations from a transfer voltage power supply which applies a primary transfer voltage to each of the primary transfer members to cause a primary transfer current to flow to each of the primary transfer members,

- wherein the power supply line and each of the primary transfer members are connected via a high-voltage resistor unit that includes a plurality of resistors connected in series and having different resistance values, and
- a resistance value of the high-voltage resistor unit is adjusted by combination of the plurality of resistors having the different resistance values.

2. The intermediate transfer unit according to claim 1,
wherein a resistance value of one of the resistors of the high-voltage resistor unit is equal to or greater than 100 M□, and a resistance value of the others of the resistors is equal to or greater than 1 M□ and equal to or less than 100 M□.

3. The intermediate transfer unit according to claim 1,
wherein resistance values of the high-voltage resistor units that are connected to the primary transfer members aligned in a conveyance direction of the toner images are sequentially decreased toward a downstream side in the conveyance direction.

4. The intermediate transfer unit according to claim 1,
wherein the resistance value of the high-voltage resistor unit is greater than a resistance value of the primary transfer member to which the high-voltage resistor unit is connected.

5. The intermediate transfer unit according to claim 1,
wherein in the high-voltage resistor unit, a lead wire is arranged in an air gap where the resistor is not mounted to connect the power supply line and the primary transfer member.

6. An image forming apparatus comprising:
- the intermediate transfer unit according to claim 1;
- image formation units that include the image carrying members to form an image;
- a storage unit that stores the transfer current flowing to each of the primary transfer members or the primary transfer voltage which is applied; and
- a control unit that performs image formation based on the transfer current or the primary transfer voltage stored in the storage unit.

7. A method for manufacturing an intermediate transfer unit,
- wherein the intermediate transfer unit includes:
  - a seamless intermediate transfer belt on which toner images formed on a plurality of image carrying members are sequentially stacked;
  - a plurality of primary transfer members that
    - are respectively arranged opposite the image carrying members via the intermediate transfer belt, and
    - transfer the toner images formed on the image carrying members onto the intermediate transfer belt;
  - a power supply line that
    - branches to at least two or more locations from a transfer voltage power supply which applies a primary transfer voltage to each of the primary transfer members to cause a primary transfer current to flow to each of the primary transfer members; and
  - a high-voltage resistor unit that connects the power supply line and each of the primary transfer members,
- the method for manufacturing an intermediate transfer unit comprises:
  - a current measurement step of measuring the primary transfer current flowing to each of the primary transfer members; and a resistor determination step of determining a resistor of the high-voltage resistor unit based on the primary transfer current measured in the current measurement step the current measurement step and the resistor determination step are sequentially, and a resistance value of the high-voltage resistor unit is adjusted by combination of a plurality of resistors connected in series and having different resistance values.

8. The method for manufacturing an intermediate transfer unit according to claim 7, wherein a resistance value of the resistor that is determined in a subsequent round of the resistor determination step is less than a resistance value of the resistor that has been determined in a previous round of the resistor determination step.

* * * * *